United States Patent [19]
Dove

[11] Patent Number: 5,910,986
[45] Date of Patent: Jun. 8, 1999

[54] METHODS AND APPARATUS FOR SENDING ELECTRONIC DATA SIGNALS

[75] Inventor: Lee G. Dove, Perthshire, United Kingdom

[73] Assignee: NCR Corporation, Dayton, Ohio

[21] Appl. No.: 08/778,337

[22] Filed: Jan. 2, 1997

[30] Foreign Application Priority Data

Sep. 13, 1996 [GB] United Kingdom .................. 9619189

[51] Int. Cl.$^6$ ........................................................ G06F 1/00
[52] U.S. Cl. ................................................. 380/23; 380/43
[58] Field of Search ........................................ 380/23, 43

[56] References Cited

U.S. PATENT DOCUMENTS

| | | | |
|---|---|---|---|
| 4,317,957 | 3/1982 | Sendrow | 178/22.08 |
| 4,349,695 | 9/1982 | Morgan et al. | 178/22.08 |
| 4,652,698 | 3/1987 | Hale et al. | 380/24 |
| 4,679,236 | 7/1987 | Davies | 380/23 |
| 5,241,594 | 8/1993 | Kung | 380/4 |
| 5,432,850 | 7/1995 | Rothenberg . | |
| 5,602,933 | 2/1997 | Blackwell et al. | 382/116 |
| 5,604,803 | 2/1997 | Aziz | 380/25 |
| 5,638,448 | 6/1997 | Nguyen | 380/29 |
| 5,732,137 | 3/1998 | Aziz | 380/25 |
| 5,745,574 | 4/1998 | Muftic | 380/23 |
| 5,841,970 | 11/1998 | Tabuki | 395/187.01 |
| 5,845,070 | 12/1998 | Ikduome | 395/187.01 |

FOREIGN PATENT DOCUMENTS 410078930 3/1998 Japan .................................. 380/23

OTHER PUBLICATIONS

Shieh et al., "An Authentication and Key Distribution System for Open Network Systems", Operating Systems Review (SIGOPS), vol. 30, No. 2, Apr. 1, 1996, pp. 32–41, XP000585087.

Prabhu et al., "Security in computer networks and distributed systems", Computer Communications, vol. 19, No. 5, May 1, 1996, pp. 379–388, XP000593526.

*Primary Examiner*—Tod R. Swann
*Assistant Examiner*—Paul E. Callahan

[57] ABSTRACT

Where sensitive information forming part of a transactional flow application is required to be sent over an open network such as the Internet, for example from a World Wide Web site, a time stamp and a location stamp are included in a request for such information from a user. The time stamp carries the time at which a previous page in the application was sent to the client and the location stamp carries the client address as provided for that previous page. Preferably the stamps are encrypted and are thus protected at the user location.

9 Claims, 2 Drawing Sheets

METHODS AND APPARATUS FOR SENDING ELECTRONIC DATA SIGNALS

BACKGROUND OF THE INVENTION

This invention relates to methods and apparatus for sending electronic data signals. The invention is concerned with the sending of such signals over an open communications network comprising one or more server stations and a plurality of client stations. The Internet is such a network, comprising as it does many thousands of server stations and millions of client stations which use the world-wide public telecommunication network to communicate with each other. However the invention is not limited to the Internet and has application in more limited open networks such as many forms of intra-office network.

In the case of the Internet, one very widely used system for providing data is the World Wide Web (often abbreviated to WWW or more colloquially "The Web"). In The Web a server station or "site" may provide a series of screens or "pages" of information which the client requests in sequence by sending the appropriate request signals over the Internet. One or more pages may be in the format of a form in which the user is required to enter data in boxes on the page. The form is then sent to the server site. The Web has a standard protocol for information transfers known as the HyperText Transfer Protocol (HTTP) and request signals from a client and data signals from a server are in a format known as HyperText Mark-up Language (HTML).

Use of The Web is increasing at a rapid rate and there are many multi-page applications in which specific data provided by a client on a form page is required before a later page can be sent. An example is a financial transaction in which a password, PIN number or a user identification (ID) number must be supplied to a server station before data of a sensitive nature is passed to the client. HTTP requires that each request for a page is treated separately and each such request must be in the form of a Universal Resource Locator (URL) string. A URL string may therefore include sensitive data. The problem of protecting data provided by a user is known and encryption techniques are already applied to the data stream between the client and the server in World Wide Web applications. However this encryption does not protect the data while it is at the client station. The URL string is often displayed openly at the user station and even if it is not browsers (the software used for communications on The Web) usually have a "view" option or the data can be accessed in other ways. Thus authorization data of a kind which will give access to sensitive and supposedly protected information held at a server station is displayed or is available at a client station without restriction.

SUMMARY OF THE INVENTION

It is an object of the invention to provide for the invalidation of such authorization data for other than legitimate use.

According to the invention in one aspect a method of transmitting electronic data signals across an open communications network from a server station to a client station on receipt of a request signal from a client station for such data comprises the steps of checking whether a request signal received at a server station includes a validation stamp, said validation stamp being selected from a time stamp and a location stamp, providing an approval signal if the said validation stamp is valid, and sending the requested data signals only if an approval signal is provided.

According to the invention in another aspect apparatus for transmitting electronic data signals across an open communications network from a server station to a client station on receipt of a request signal from a client station for such data comprises means for checking whether a request signal received at a server station includes a validation stamp, said validation stamp being selected from a time stamp and a location stamp, validation means for providing an approval signal if the said stamps are valid, and transmission means for sending the requested data signals only if an approval signal is provided by the validation means.

A "stamp" in this context means an electronic data signal which includes the relevant information in an appropriate format, for example HTML.

In carrying out the invention the request signal may include both a time stamp and a location stamp. These stamps may be generated in the server station when sending prior data signals to the client station and are preferably encrypted before being sent.

Appropriate criteria for determining whether the time stamp is valid could be that the time interval between a prior response signal from the server to the client on the same transaction (and in which the time stamp is embedded) and the server receiving the time stamp from the client station is less than a predetermined value, for example 15 minutes. Likewise the location stamp will be valid only if the caller identification provided with the request signal corresponds to a location stamp derived from a client identification signal previously sent to the server and embedded in the request signal.

BRIEF DESCRIPTION OF THE DRAWINGS

In order that the invention may be more fully understood reference will now be made to the accompanying drawings, in which.

DETAILED DESCRIPTION

Figure 1:
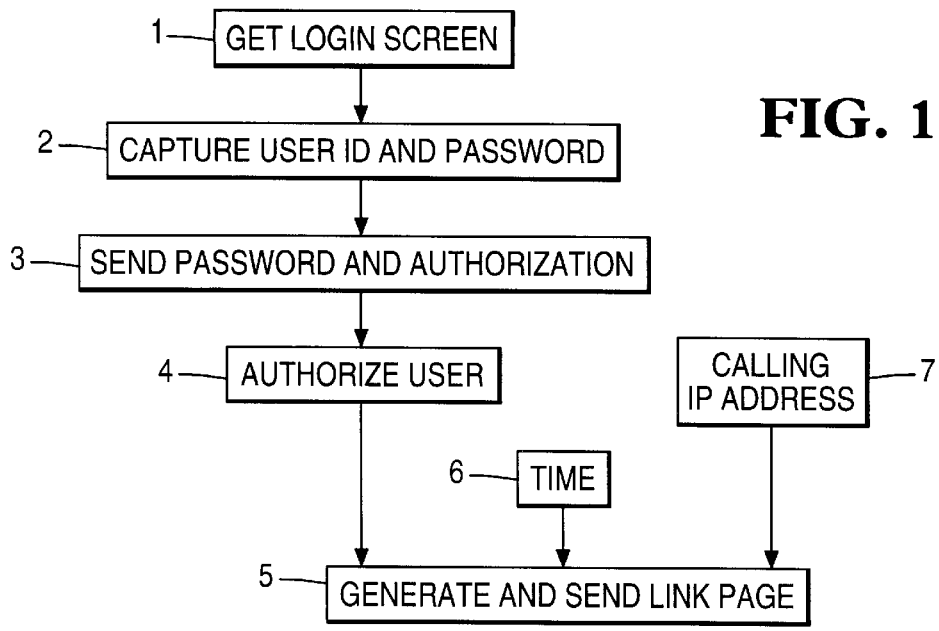
FIG. 1 is a flow chart of a typical page authorization procedure taking place at a Web site, modified to initiate a validation procedure in accordance with the invention.

Referring now to FIG. 1, there is shown therein a flow chart of a series of logical steps which take place in a Web application at a server station. In step 1 a user request for a login screen is received and processed. The login screen will typically be a form page with a so-called "forms and field" feature. This page, as well as subsequent pages, will be transmitted to the user in HTML. The information required to complete the forms page, including data such as a user ID and a password, is entered by the user on his screen and when the forms page is completed it is sent to the server and the information is captured there. This capture step is shown as step 2 in FIG. 1.

In step 3 the server checks the veracity of the password provided by the user and if this is correct then in step 4, shown as "Authorize User", authorizes the preparation of the next page, which typically will be a link page. The link page is generated by building up a HTML file for sending to the user. This operation, step 5, is the last step of FIG. 1. For this step, in addition to encoding the information required to display the link page at the user, further information, consisting of the current time (box 6) and the user's calling address (box 7) as now available at the server, having already been sent there by the user, is also provided. The way in which step 5 functions is shown in more detail in FIG. 2.

Figure 2:
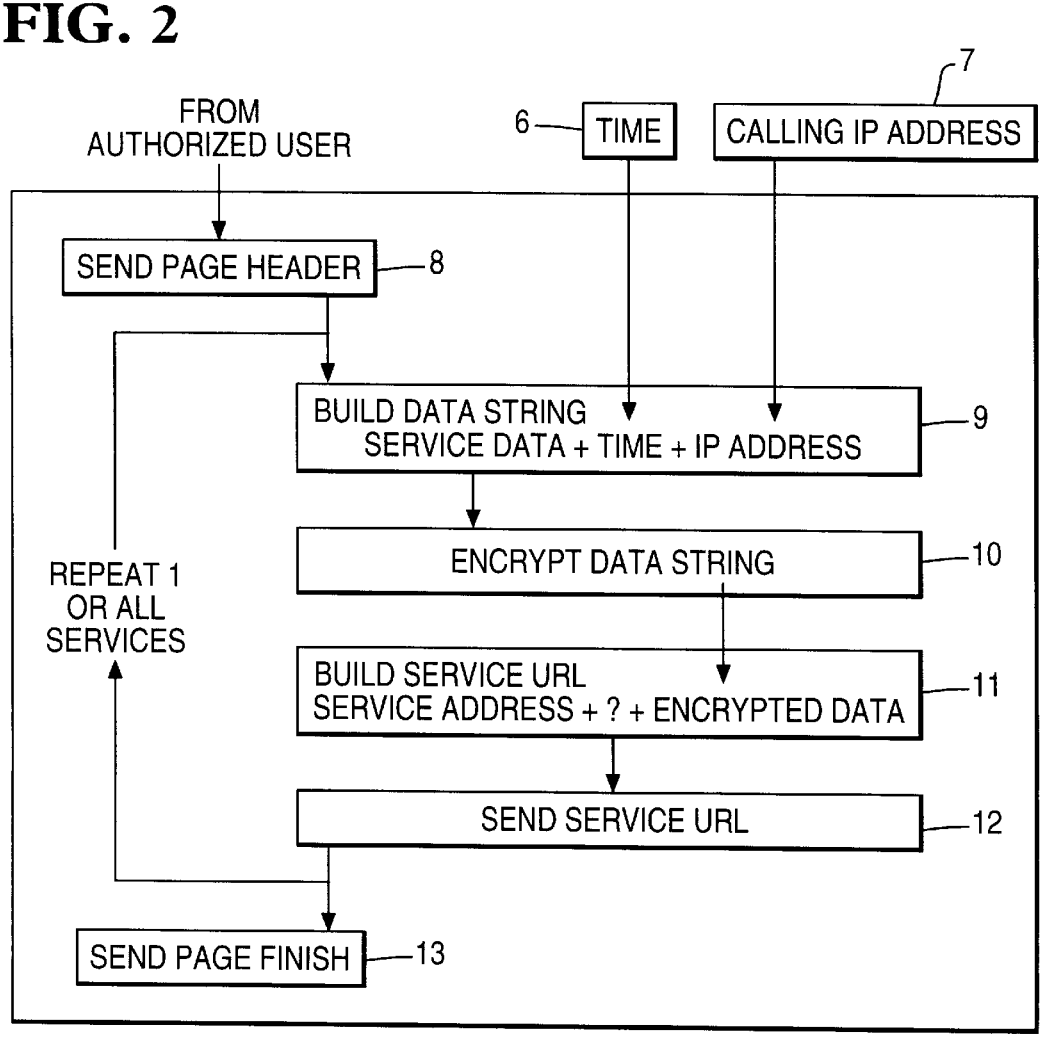
FIG. 2 shows the last step of FIG. 1 in more detail.

Referring now to FIG. 2 a signal from the "Authorize User" step (shown as step 4 in FIG. 1) initiates the operation of FIG. 2. First a standard HTML page header is generated (box 8) and then the required data string for the link page is built up (box 9). This string includes as a minimum the user's ID and password. To this is added the current time at the server from box 6 and user identification in the form of the user's Internet Address from box 7. The whole data string is then encrypted using a suitable encryption technique or algorithm, for example RSA or DES, as shown in box 10.

The encrypted data string is used in box 11 to build a service URL for transmission to the user. The service URL comprises the service address of the client, a separator (in HTML this is the symbol "?") and the encrypted data string from box 10. This URL is sent to the client as shown in box 12 for interpretation by his browser and then display at his station. The final part of the transmission is a standard page finish in HTML form (box 13).

An example of an HTML file representing the last item of FIG. 1, and built up as detailed in FIG. 2 is set out in Table 1 below. The following line from Table 1 gives the relevant data in which a time stamp and a location stamp is embedded. The section in bold carries the encrypted stamps:
<A HREF="webfin04.exe?1+bgfbadXbje\ll.bje\llXihe'fn4ah">Account Statements</A>
The link page can have any number of encrypted strings, and in fact it is typical for there to be more than one. This gives the user a menu of options to choose from. Several such strings are provided in Table 1.

TABLE 1

Typical HTML File with Encrypted Data

<HTML><HEADER><TITLE>NCR Internet Banking:
Main Menu</TITLE>
</HEADER>
<BODY BACKGROUND="money.gif">
<CENTER><H1>NCR Internet Banking Services</H1><P>
<IMG WIDTH=480 HEIGHT=5 SRC="line115.jpg"><P>
</CENTER>
<CENTER><H2>
----Select a Service----</H2><P>
<IMG WIDTH=480 HEIGHT=5 SRC="line115.jpg"><P>
<TABLE COLSPAN=2>
<TD><H2>IMG SRC="cc2.gif">
HREF="webfin03.exe?1+
bgfbadXbje\11.bje\11Xihe'fn4ah">Balance Inquiry4A></TD>
<TD><H2>IMG SRC="cc2.gif">
<A HREF="webfin04.exe?1+
bgfbadXbje\11.bje[1]1Xihe'fn4ah">Account Statements</A></TD><TR>
<TD><H2>IMG SRC="cc2.gif">
<A HREF="webfin05.exe?1+
bgfbadXbje\11.bje\11Xihe'fn4ah">Funds Transfer</A></TD>
<TD><H2>IMG SRC="cc2.gif">
<A HREF="webfin06.exe?1+
bgfbadXbje\11.bje\11Xihe'fn4ah">Bill Payment</A></TD>
</TABLE><CENTER><P><H2><IMG SRC="cc2.gif">
<A HREF="web_fin.htm">Exit</A></H2><P>
<CENTER><P>
<IMG WIDTH=480 HEIGHT=5 SRC="line115.jpg"><P>
<H3>©Technology Development Division 1995, 1996<BR>
NCR (Scotland) Ltd.</H3>
</BODY>

Figure 3:
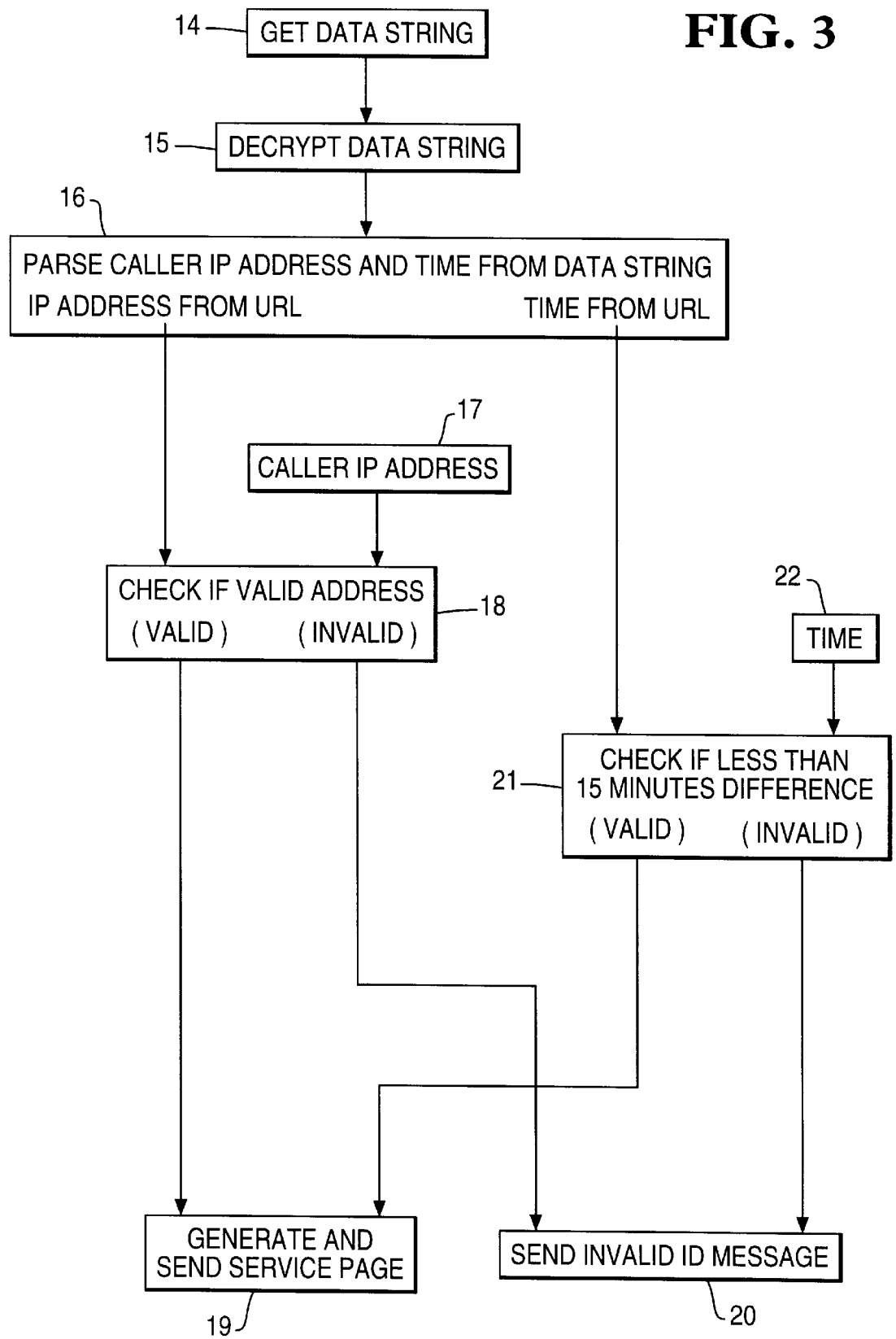
FIG. 3 is a flow chart of action taken at the server on receipt of a request signal from the client for sensitive data.

On receipt of the data signal set out in Table 1 at the client station the user has the opportunity to request information from the server which is of a sensitive nature, often, as in the example of Table 1, with a menu choice of several sensitive items. In the example shown in Table 1 the client can make a bank balance inquiry and/or instruct the transfer of funds. When the client sends a request signal to the server station for information or action, as the case may be, the signal pattern of Table 1 is such that the data string encrypted in box 10 of FIG. 2 has no recognizable delimiter and hence is returned automatically to the server from the client as part of his request signal. What now happens at the server is set out in FIG. 3. The request signal is received in step 14 as a data string. The received string is decrypted in step 15. In box 16 the decrypted data string is parsed to extract the location stamp and the time stamp. Both of these stamps were previously generated at the server station by insertion in step 9. The caller IP address included in the request signal just received as part of the HTML protocol (and held in box 17) is checked in box 18. This checking operation consists of a comparison of the caller's address with the location stamp that was extracted in box 16. If the two addresses are identical the caller's address is validated, in which case an approval signal is provided to box 19. If the caller's address is invalid an "invalid" message is provided to box 20.

Likewise the time stamp contained in the data string that was built up in step 9 is extracted from the received and decrypted data string in step 16 and sent to box 21. Here it is checked against a real time signal at the server station held in box 22 and supplied from there to box 21. If the difference in the two times is less than a preset amount (say 15 minutes) an approval signal is provided to box 19. Otherwise an "invalid" signal is provided to box 20.

If two approval signals are provided to box 19 then the requested service page is sent. The new page can of course be handled as set out in FIGS. 1 and 2. If box 20 receives two "invalid" signals then an appropriate rejection message is sent to the caller station.

Use of a time stamp as described above enables a form of "time-out" protection to be used to prevent a user leaving his station logged on and therefore his Web page accessible to others in his absence. Use of a location stamp gives protection to prevent anyone else using the viewed or stored data available at a legitimate client station from another station.

It will be understood that the data protection method and apparatus described above can be used with any other form of data protection.

What is claimed is:

1. A method of transmitting electronic data signals across an open communications network from a server station to a client station upon receipt of a request signal from the client station for such data signals, the method comprising the steps of:

(a) checking whether the request signal received at the server station includes a validation stamp selected from a time stamp and a location stamp;

(b) providing an approval signal if the validation stamp is valid; and (c) sending the requested data signals only if an approval signal is provided.

2. A method according to claim 1, wherein the request signal includes both a time stamp and a location stamp.

3. A method according to claim 1, wherein the time stamp and/or the location stamp is generated in the server station when sending prior data signals to the client station.

4. A method according to claim 3, wherein the time stamp and/or the location stamp is encrypted at the server station prior to sending to the client station.

5. A method according to claim 1, wherein step (a) includes the step of:

(a-1) ascertaining whether the time stamp is earlier than a preset time.

6. A method according to claim 1, wherein step (a) includes the step of:

(a-1) ascertaining whether the caller's address accompanying the request signal corresponds to the location stamp embedded in the request signal.

7. An apparatus for transmitting electronic data signals across an open communications network from a server station to a client station upon receipt of a request signal from the client station for such data signals, the apparatus comprising:

means for checking whether the request signal received at the server station includes a validation stamp, the validation stamp being selected from a time stamp and a location stamp;

validation means for providing an approval signal if the stamps are valid; and transmission means for sending the requested data signals only if an approval signal is provided by the validation means.

8. An apparatus according to claim 7, further comprising means provided at the server station for embedding the validation stamp in a prior data signal sent to the client station in a manner such that the validation stamp becomes included in the request signal.

9. An apparatus according to claim 7, further comprising means for encrypting the stamps.

* * * * *